US011960765B2

(12) United States Patent
Kang et al.

(10) Patent No.: US 11,960,765 B2
(45) Date of Patent: Apr. 16, 2024

(54) STORAGE DEVICE AND METHOD OF OPERATING THE SAME

(71) Applicant: SK hynix Inc., Gyeonggi-do (KR)

(72) Inventors: Hye Mi Kang, Gyeonggi-do (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 61 days.

(21) Appl. No.: 17/532,789

(22) Filed: Nov. 22, 2021

(65) Prior Publication Data

US 2022/0398040 A1 Dec. 15, 2022

(30) Foreign Application Priority Data

Jun. 11, 2021 (KR) .................. 10-2021-0076160

(51) Int. Cl.
*G06F 3/06* (2006.01)
(52) U.S. Cl.
CPC .......... *G06F 3/0659* (2013.01); *G06F 3/0616* (2013.01); *G06F 3/0673* (2013.01)
(58) Field of Classification Search
CPC ..... G06F 3/0659; G06F 3/0616; G06F 3/0673
See application file for complete search history.

(56) References Cited

U.S. PATENT DOCUMENTS

| 10,528,287 B2* | 1/2020 | Nakanishi | G06F 3/0659 |
| 2007/0038901 A1* | 2/2007 | Shiota | G11C 16/349 |
| | | | 714/54 |
| 2011/0246841 A1* | 10/2011 | Honda | G11C 16/10 |
| | | | 714/721 |
| 2012/0311230 A1* | 12/2012 | Larson | G06F 3/0679 |
| | | | 711/E12.008 |
| 2016/0071604 A1* | 3/2016 | Kurita | G11C 11/5628 |
| | | | 365/185.11 |
| 2018/0349059 A1* | 12/2018 | Nakanishi | G06F 11/0751 |
| 2018/0364911 A1* | 12/2018 | Gupta | G06F 3/0622 |
| 2022/0171539 A1* | 6/2022 | Ravimohan | G06F 3/0614 |
| 2022/0342604 A1* | 10/2022 | Boehm | G06F 3/0659 |

FOREIGN PATENT DOCUMENTS

| KR | 10-2009-0000192 A | 1/2009 | |
| KR | 10-1287817 B1 | 7/2013 | |
| WO | WO-2008042467 A1 * | 4/2008 | ......... G06F 12/0246 |

OTHER PUBLICATIONS

The Acronis Knowledge Base that discloses the S.M.A. R.TAttribute: Erase Fail Count https://kb.acronis.com/content/9167?ckattempt=1 (Year: 2010).*

* cited by examiner

*Primary Examiner* — Michael Krofcheck
*Assistant Examiner* — Janice M. Girouard
(74) *Attorney, Agent, or Firm* — IP & T GROUP LLP

(57) ABSTRACT

The present technology relates to a storage device. According to the present technology, a memory controller controlling a memory device including a plurality of memory blocks may include an operation controller and a lifetime information controller. The operation controller may control the memory device to receive a write request from a host and perform a write operation on a selected memory block among the plurality of memory blocks. The lifetime information controller may generate lifetime information including a lifetime level of the selected memory block based on an erase and write count of the selected memory block.

17 Claims, 15 Drawing Sheets

STORAGE DEVICE AND METHOD OF OPERATING THE SAME

CROSS-REFERENCE TO RELATED APPLICATION

The present application claims priority under 35 U.S.C. § 119(a) to Korean patent application number 10-2021-0076160, filed on Jun. 11, 2021, and which is incorporated herein by reference in its entirety.

BACKGROUND

Field of Invention

The present disclosure relates to an electronic device, and more particularly, to a storage device and a method of operating the same.

Description of Related Art

A storage device is a device that stores data under control of a host device such as a computer or a smartphone. A storage device may include a memory device in which data is stored and a memory controller controlling the memory device. The memory device is divided into a volatile memory device and a nonvolatile memory device.

The volatile memory device is a device that stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device having improved memory lifetime management performance, and a method of operating the same.

According to an embodiment of the present disclosure, a memory controller controlling a memory device including a plurality of memory blocks may include an operation controller and a lifetime information controller. The operation controller may receive a write request from a host and control the memory device to perform a write operation on a selected memory block among the plurality of memory blocks. The lifetime information controller may generate lifetime information including a lifetime level of the selected memory block based on an erase and write count of the selected memory block.

According to an embodiment of the present disclosure, a method of operating a memory controller controlling a memory device including a plurality of memory blocks may include receiving a write request from a host, generating lifetime information including a lifetime level of a selected memory block based on an erase and write count of the selected memory block among the plurality of memory blocks, and providing, to the memory device, a program command for storing write data and the lifetime information in the selected memory block.

According to an embodiment of the present disclosure, a storage device may include a memory device including a plurality of memory blocks, and a memory controller. The memory controller may control the memory device to perform an operation on a selected memory block among the plurality of memory blocks according to a request received from a host, generate lifetime information including a lifetime level of the selected memory block based on a lifetime determination reference and an erase and write count of the selected memory block, and provide, to the host, the lifetime information together with a response to the request.

According to an embodiment of the present disclosure, an operating method of a controller comprises: controlling, in response to a request from a host, a memory device to access a memory block included therein and providing, to the host, information on a remaining erase/write (EW) count of the memory block together with a response to the request. The information includes an alert signal for a shortage of the remaining EW count when the remaining EW count is less than a threshold that is set by the host.

According to the present technology, a storage device having improved memory lifetime management performance, and a method of operating the same are provided.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
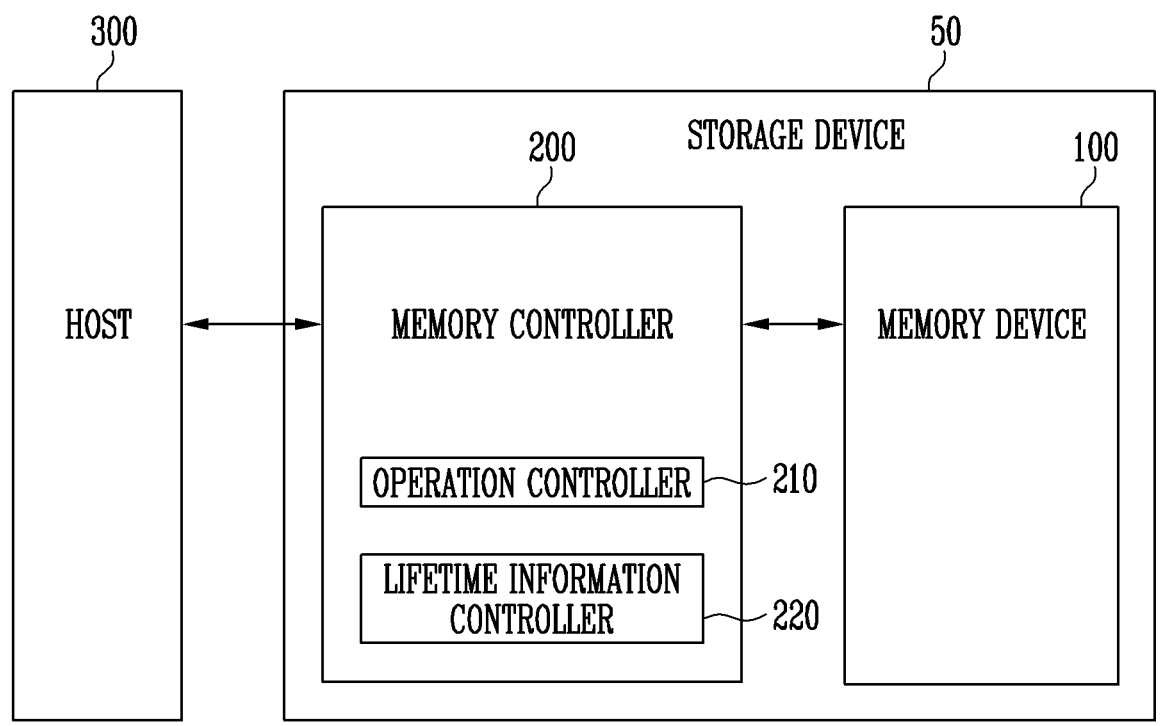
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200 that controls an operation of the memory device. The storage device 50 is a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured as any of various types of packages. For example, the storage device 50 may be manufactured as any of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address of the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the logical block address (LBA) into a physical block address (PBA) indicating an address of memory cells in which data included in the memory device 100 is to be stored.

The memory controller 200 may control the memory device 100 to perform the program operation, the read operation, or the erase operation in response to a request of the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. In this case, the memory controller 200 may control the memory devices 100 according to an interleaving method to improve operation performance. The interleaving method may be an operation method for overlapping operation periods of at least two memory devices 100.

In an embodiment, the memory controller 200 may control the memory device 100 to perform an operation according to a request received from the host 300 on a selected memory block among the plurality of memory blocks. The memory controller 200 may generate lifetime information including a lifetime level of the selected memory block based on a lifetime determination reference and an erase and write count of the selected memory block. The memory controller 200 may provide lifetime information to the host 300 in response to the request received from the host 300.

The memory controller 200 may set the lifetime determination reference and an alert level based on a lifetime reference setting command received from the host 300. The lifetime determination reference may be a reference for determining the lifetime level of the memory block based on the erase and write count of the memory block. The alert level may be a threshold lifetime level at which it is determined that the lifetime of the memory block is in an alert state. In an embodiment, the lifetime determination reference may include at least one of a lifetime level table and a lifetime level function.

When the memory controller 200 does not receive the lifetime reference setting command from the host 300, the memory controller 200 may set the lifetime determination reference and the alert level as a preset default value.

The memory controller 200 may determine the lifetime level of the selected memory block based on the lifetime determination reference and the erase and write count of the selected memory block. When the lifetime level of the selected memory block is greater than or equal to the alert level, the memory controller 200 may provide lifetime information including the lifetime level of the selected memory block and a flag indicating that the lifetime of the selected memory block is in an alert state to the host 300.

In an embodiment, the memory controller 200 may include an operation controller 210 and a lifetime information controller 220.

The operation controller 210 may receive a request from the host 300 and control the memory device 100 to perform an operation according to the request. The operation controller 210 may provide a response to the request to the host 300.

For example, the operation controller 210 may control the memory device 100 to perform the write operation on the selected memory block among the plurality of memory blocks according to a write request received from the host 300. The operation controller 210 may control the memory device 100 to store write data corresponding to the write request and the lifetime information including the lifetime level of the selected memory block in the selected memory block. The memory device 100 may store the write data in a main area of the selected memory block and store the lifetime information in a spare area. The operation controller 210 may provide the lifetime information to the host 300 in response to the write request.

The operation controller 210 may control the memory device 100 to perform the read operation on the selected memory block among the plurality of memory blocks according to a read request received from the host 300. The operation controller 210 may control the memory device 100 to read target data stored in the main area of the selected memory block and the lifetime information stored in the spare area. The operation controller 210 may provide the target data and the lifetime information to the host 300 in response to the read request.

The lifetime information controller 220 may set the lifetime determination reference and the alert level including at least one of the lifetime level table and the lifetime level function based on the lifetime reference setting command received from the host 300. When the lifetime information controller 220 does not receive the lifetime reference setting command from the host 300, the lifetime information controller 220 may set the lifetime determination reference and the alert level as the preset default value.

The lifetime information controller 220 may determine the lifetime level of the selected memory block based on the lifetime determination reference and the erase and write count of the selected memory block.

For example, the lifetime information controller 220 may determine the lifetime level based on a section to which the erase and write count of the selected memory block belongs among a plurality of sections included in the lifetime level table. The lifetime level table may include a plurality of lifetime levels respectively corresponding to a plurality of sections divided by a plurality of reference values. As another example, the lifetime information controller 220 may determine the lifetime level by putting the erase and write count of the selected memory block into a lifetime level function including a maximum erase and write count of the memory block.

A method of determining the lifetime level is not limited to the present embodiment. The lifetime level may be variously determined by applying a method of setting by the host 300 the erase and write count of the selected memory block.

The lifetime information controller 220 may generate the lifetime information including the lifetime level of the selected memory block based on the lifetime determination reference and the erase and write count of the selected memory block. When the lifetime level of the selected memory block is greater than or equal to the alert level, the lifetime information controller 220 may generate the lifetime information including the lifetime level of the selected memory block and the flag indicating that the lifetime of the selected memory block is in the alert state.

The host 300 may communicate with the storage device using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

In an embodiment, the host 300 may determine reliability of the selected memory block in which data is stored based on the lifetime information received from the memory controller 200. The host 300 may know that the lifetime of the selected memory block storing the data is in the alert state, based on the flag received from the memory controller 200. The host 300 may back up the data stored in the selected memory block or limit the number of accesses to the selected memory block according to the flag and the reliability of the selected memory block.

Figure 2:
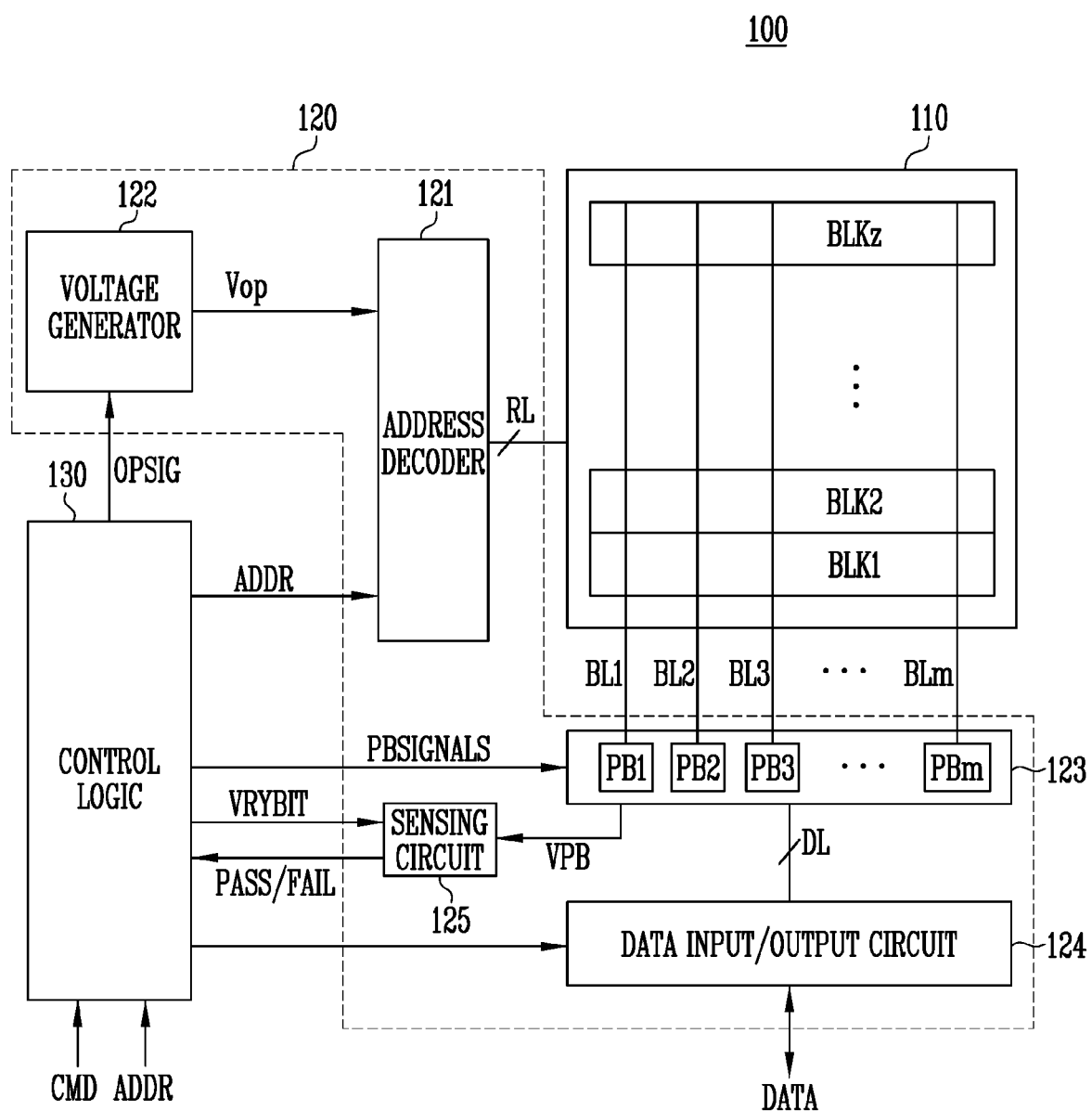
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are nonvolatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells, and between a source select transistor and the memory cells.

Each of the memory cells of the memory device 100 may be configured as an SLC that stores one data bit, an MLC that stores two data bits, a TLC that stores three data bits, or a QLC that stores four data bits.

The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address of the received address ADDR. The address decoder 121 may select at least one word line among word lines of a selected memory block according to the decoded address. The address decoder 121 may apply an operation voltage Vop received from the voltage generator 122 to the selected word line.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in a memory block unit. The address ADDR input to the memory device 100 during the erase operation includes a block address. The address decoder 121 may decode the block address and select at least one memory block according to the decoded block address. During the erase operation, the address decoder 121 may apply a ground voltage to the word lines input to the selected memory block.

According to an embodiment of the present disclosure, the address decoder 121 may be configured to decode a column address of the transferred address ADDR. The decoded column address may be transferred to the read and write circuit 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop.

The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of program, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL and store the read data DATA in the first to m-th page buffers PB1 to PBm.

During the erase operation, the read and write circuit 123 may float the bit lines BL. In an embodiment, the read and write circuit 123 may include a column selection circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm included in the read and write circuit 123 to the external controller.

During the read operation or the verify operation, the sensing circuit 125 may generate a reference current in response to a signal of a permission bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the address ADDR, a read and write circuit control signal PBSIGNALS, and the permission bit VRYBIT in response to the command CMD and the address ADDR. The control logic 130 may output the operation signal OPSIG to the voltage generator 122, output the address ADDR to the address decoder 121, output the read and write circuit control signal PBSIGNALS to the read and write circuit 123, and output the permission bit VRYBIT to the sensing circuit 125. In addition, the control logic 130 may determine whether the verify operation has passed or failed in response to the pass or fail signal PASS/FAIL output by the sensing circuit 125.

Figure 3:
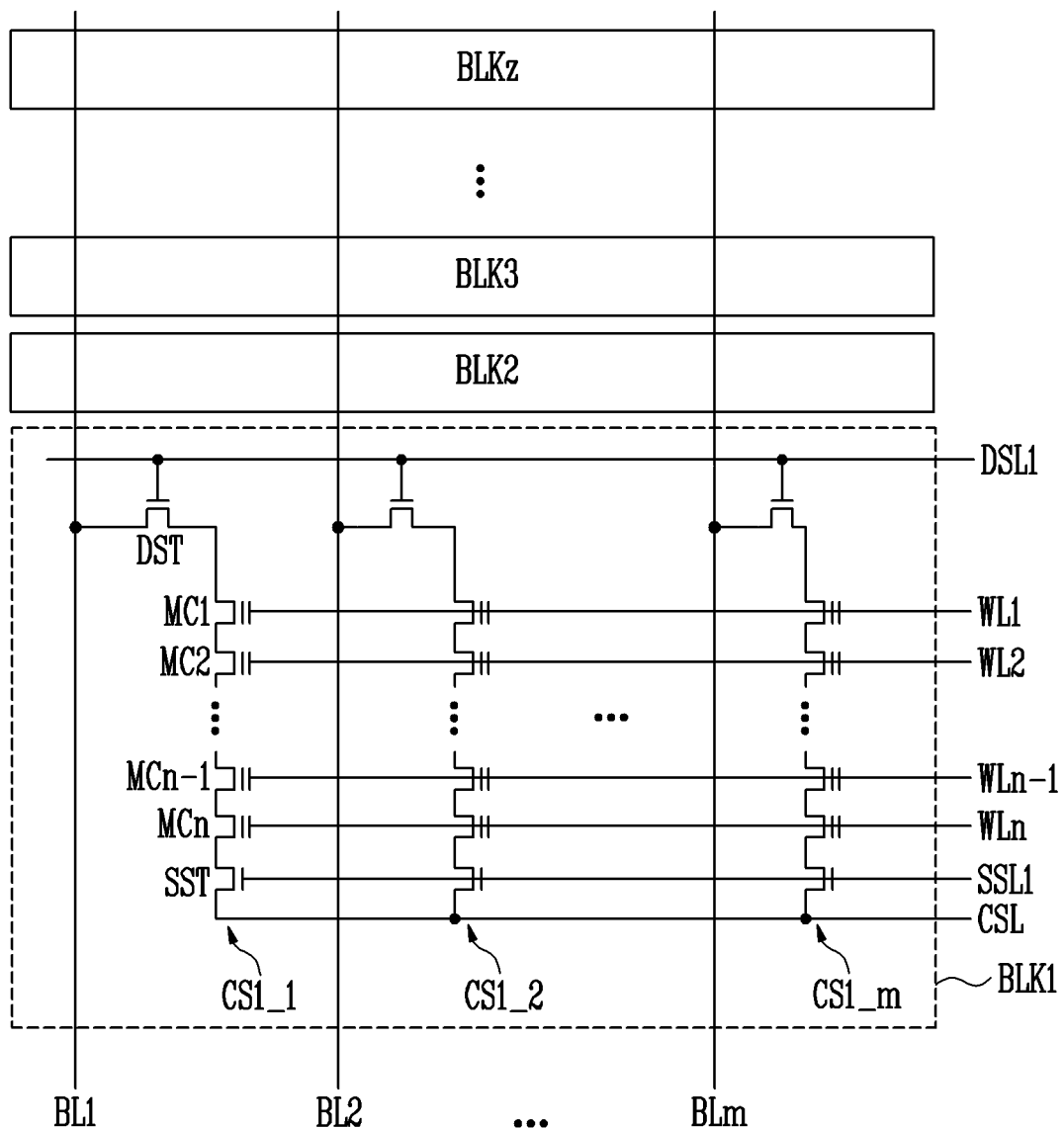
FIG. 3 is a diagram illustrating a memory cell array of FIG. 2 according to an embodiment of the present disclosure.

FIG. 3 is a diagram illustrating the memory cell array of FIG. 2 according to an embodiment of the present disclosure.

Referring to FIG. 3, the first to z-th memory blocks BLK1 to BLKz are commonly connected to the first to m-th bit lines BL1 to BLm. In FIG. 3, for convenience of description, elements included in the first memory block BLK1 of the plurality of memory blocks BLK1 to BLKz are shown, and elements included in each of the remaining memory blocks BLK2 to BLKz are omitted. It will be understood that each of the remaining memory blocks BLK2 to BLKz is configured similarly to the first memory block BLK1.

The memory block BLK1 may include a plurality of cell strings CS1_1 to CS1_$m$, where m is a positive integer. The first to m-th cell strings CS1_1 to CS1_$m$ are connected to the first to m-th bit lines BL1 to BLm, respectively. Each of the first to m-th cell strings CS1_1 to CS1_$m$ includes a drain select transistor DST, a plurality of memory cells MC1 to MCn connected in series, where n is a positive integer, and a source select transistor SST.

Gate terminals of the drain select transistors DST included in each of the first to m-th cell strings CS1_1 to CS1_$m$ are connected to a drain select line DSL1. Gate terminals of the first to n-th memory cells MC1 to MCn included in each of the first to m-th cell strings CS1_1 to CS1_$m$ are connected to the first to n-th word lines WL1 to WLn, respectively. Gate terminals of the source select transistors SST included in each of the first to m-th cell strings CS1_1 to CS1_$m$ are connected to a source select line SSL1.

For convenience of description, a structure of the cell string will be described with reference to the first cell string CS1_1 of the plurality of cell strings CS1_1 to CS1_$m$. However, it will be understood that each of the remaining cell strings CS1_2 to CS1_$m$ is configured similarly to the first cell string CS1_1.

A drain terminal of the drain select transistor DST included in the first cell string CS1_1 is connected to the first bit line BL1. A source terminal of the drain select transistor DST included in the first cell string CS1_1 is connected to a drain terminal of the first memory cell MC1 included in the first cell string CS1_1. The first to n-th memory cells MC1 to MCn are connected in series with each other. A drain terminal of the source select transistor SST included in the first cell string CS1_1 is connected to a source terminal of the n-th memory cell MCn included in the first cell string CS1_1. A source terminal of the source select transistor SST included in the first cell string CS1_1 is connected to a common source line CSL. In an embodiment, the common source line CSL may be commonly connected to the first to z-th memory blocks BLK1 to BLKz.

The drain select line DSL1, the first to n-th word lines WL1 to WLn, and the source select line SSL1 are included in row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
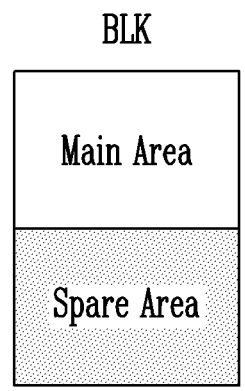
FIG. 4 is a diagram illustrating a memory block of FIG. 3 according to an embodiment of the present disclosure.

FIG. 4 is a diagram illustrating the memory block of FIG. 3 according to an embodiment of the present disclosure.

Referring to FIG. 4, the memory block may include the main area storing user data and the spare area storing meta information. The meta information may be information for managing the user data and may include mapping information, erase and write count information, read count information, the lifetime information, and the like.

In an embodiment, the spare area may be some pages among the plurality of pages included in the memory blocks. In another embodiment, the spare area may be a portion of each of the pages. A reference for dividing the main area and the spare area is not limited to the present embodiment.

Figure 5:
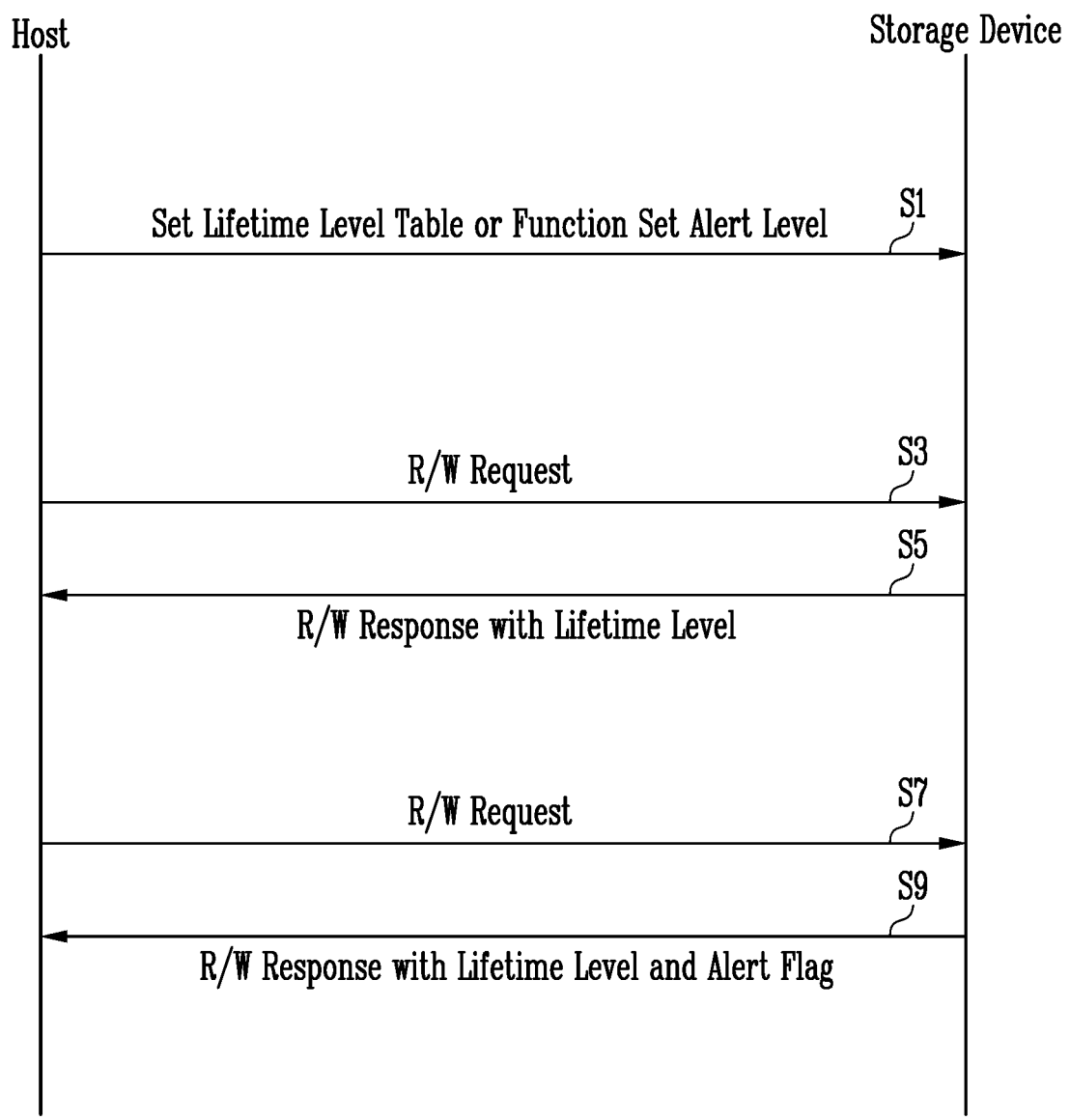
FIG. 5 is a diagram illustrating a request and a response between a host and a storage device according to an embodiment of the present disclosure.

FIG. 5 is a diagram illustrating a request and a response between a host and a storage device according to an embodiment of the present disclosure.

Referring to FIG. 5, in S1, the host may set the lifetime determination reference and the alert level of a memory block included in the storage device. In various embodiments, the host may set only the lifetime determination reference of a memory block. The alert level may be selectively set according to selection of the host.

The lifetime determination reference may include the lifetime level table or the lifetime level function. The storage device may set the lifetime determination reference and the alert level based on the lifetime reference setting command received from the host. The storage device may set the lifetime determination reference and an alert level as the preset default value when the lifetime reference setting command is not received from the host.

In S3, the host may provide the request to the storage device. The request may be the write request or the read request. The storage device may perform an operation according to the request received from the host on the selected memory block. The storage device may determine the lifetime level of the selected memory block based on the erase and write count of the selected memory block and the lifetime determination reference. The storage device may generate the lifetime information including the lifetime level.

In S5, the storage device may provide the lifetime information of a selected memory block in response to the request received from the host.

In S7, the host may provide the request to the storage device, as in S5. When the lifetime level of the selected memory block is greater than or equal to the alert level, the storage device may generate the lifetime information including the flag indicating that the lifetime of the selected memory block is in the alert state.

In S9, the storage device may provide the host with the lifetime information including the flag and the lifetime level of the selected memory block together with a response to the request received from the host.

Figure 6:
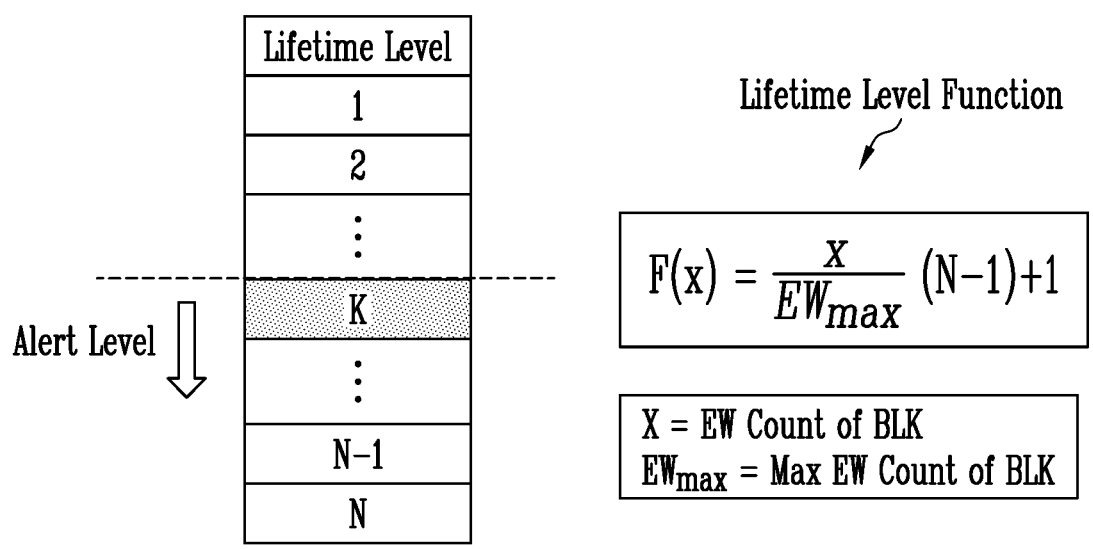
FIG. 6 is a diagram illustrating a lifetime level function according to an embodiment of the present disclosure.

FIG. 6 is a diagram illustrating a lifetime level function according to an embodiment of the present disclosure.

Referring to FIG. 6, the lifetime level function may include a maximum erase and write count of the memory block. The maximum erase and write count of the memory block may vary according to a type of the memory block. For example, in a case of the SLC and the MLC, the maximum erase and write count may be differently set.

When putting the erase and write count of the memory block into the lifetime level function, the lifetime level of the memory block may be determined. Rounding up, rounding down, rounding off, Gaussian functions, and the like may be applied so that the lifetime level function has only an integer value.

In FIG. 6, the lifetime level function may be a first-order linear function. However, the lifetime level function is not limited to the present embodiment and may be set to various mathematical equations such as a nonlinear function, a polynomial function, and an exponential function according to the request of the host.

In FIG. 6, the lifetime level of the memory block may be determined to be between 1 and N, where N is a natural number greater than or equal to 2, N representing the greatest lifetime level, which is predetermined. The alert level may be K, where K is a natural number greater than 1 and less than or equal to N. When the lifetime level of the memory block is greater than or equal to the alert level, the storage device may provide the flag indicating that the lifetime of the memory block is in the alert state to the host.

Figure 7:
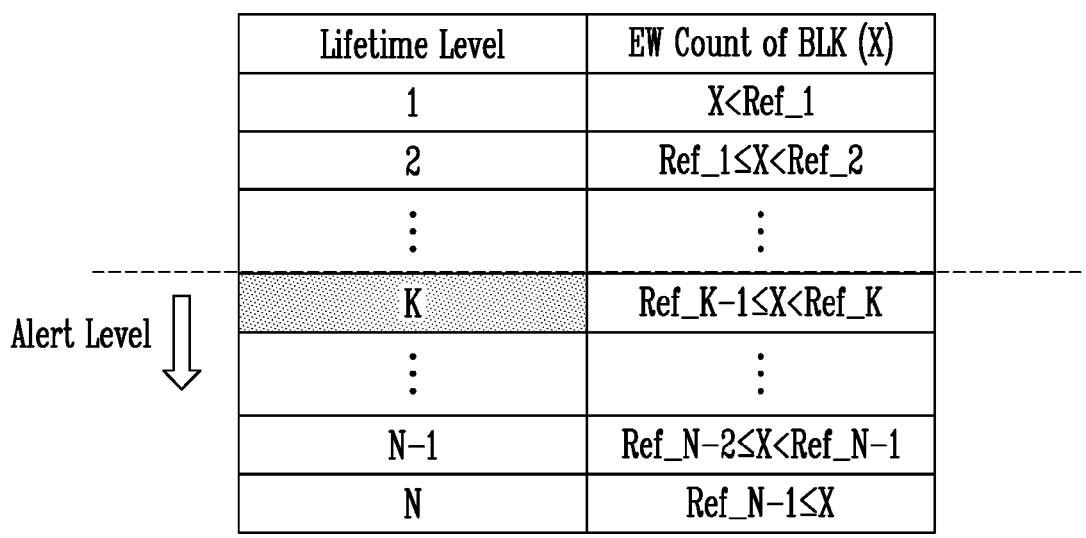
FIG. 7 is a diagram illustrating a lifetime level table according to an embodiment of the present disclosure.

FIG. 7 is a diagram illustrating a lifetime level table according to an embodiment of the present disclosure.

Referring to FIG. 7, the lifetime level table includes a plurality of lifetime levels 1 to N, where N is a natural number greater than or equal to 2, respectively corresponding to a plurality of sections divided by a plurality of reference values Ref_1 to Ref_N−1.

The plurality of reference values Ref_1 to Ref_N−1 may be variously set according to the request of the host.

The lifetime level of the memory block may determine a lifetime level corresponding to a section to which the erase and write count of the memory block belongs among the plurality of sections included in the lifetime level table. In an embodiment, the largest reference value Ref_N−1 among the plurality of reference values Ref_1 to Ref_N−1 may be the maximum erase and write count of the memory block.

The alert level may be K, where K is a natural number greater than 1 and less than or equal to N. When the lifetime level of the memory block is greater than or equal to the alert level, the storage device may provide the flag indicating that the lifetime of the memory block is in the alert state to the host.

Figure 8:
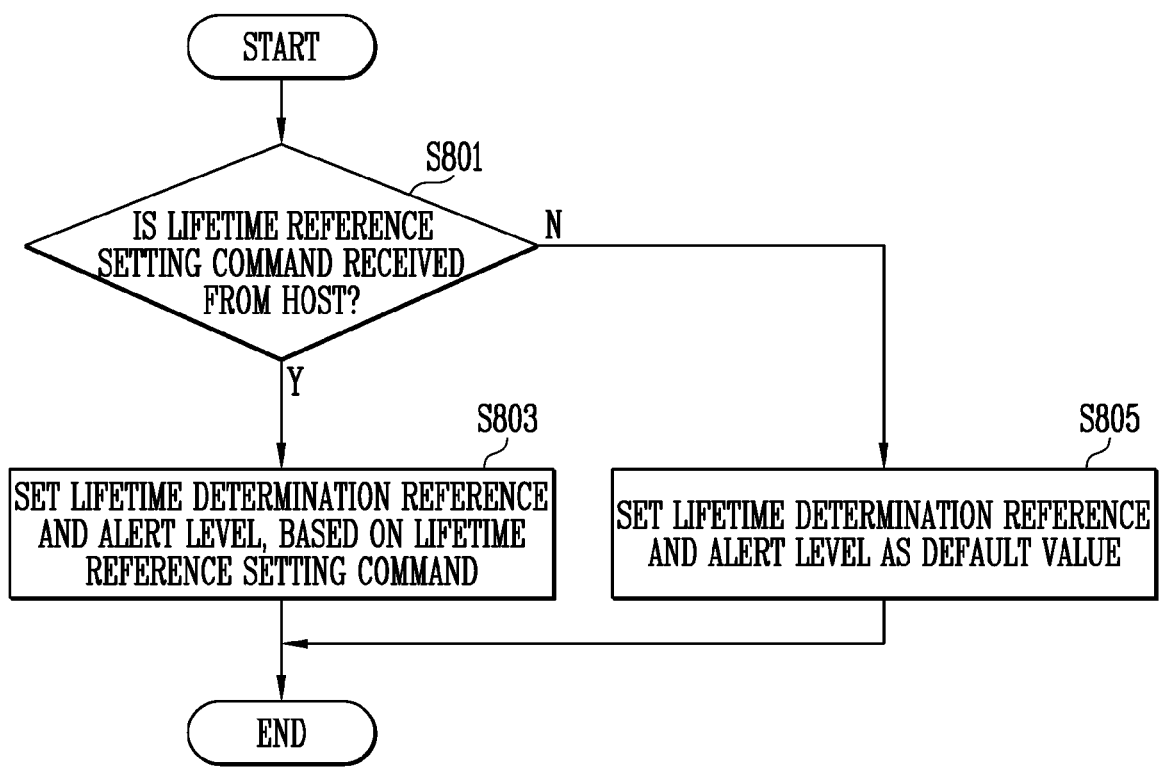
FIG. 8 is a flowchart illustrating an operation of a storage device according to an embodiment of the present disclosure.

FIG. 8 is a flowchart illustrating an operation of a storage device according to an embodiment of the present disclosure.

Referring to FIG. 8, in operation S801, the storage device may determine whether the lifetime reference setting command is received from the host. As a result of the determination, when the lifetime reference setting command is received from the host, the operation proceeds to operation S803, and when the lifetime reference setting command is not received, the operation proceeds to operation S805.

In operation S803, the storage device may set the lifetime determination reference and the alert level based on the lifetime reference setting command. The lifetime determination reference may determine at least one of the lifetime level table and the lifetime level function.

In operation S805, the storage device may set the lifetime determination reference and the alert level as the default value. The default value may be an initial value preset in a manufacturing process step.

Figure 9:
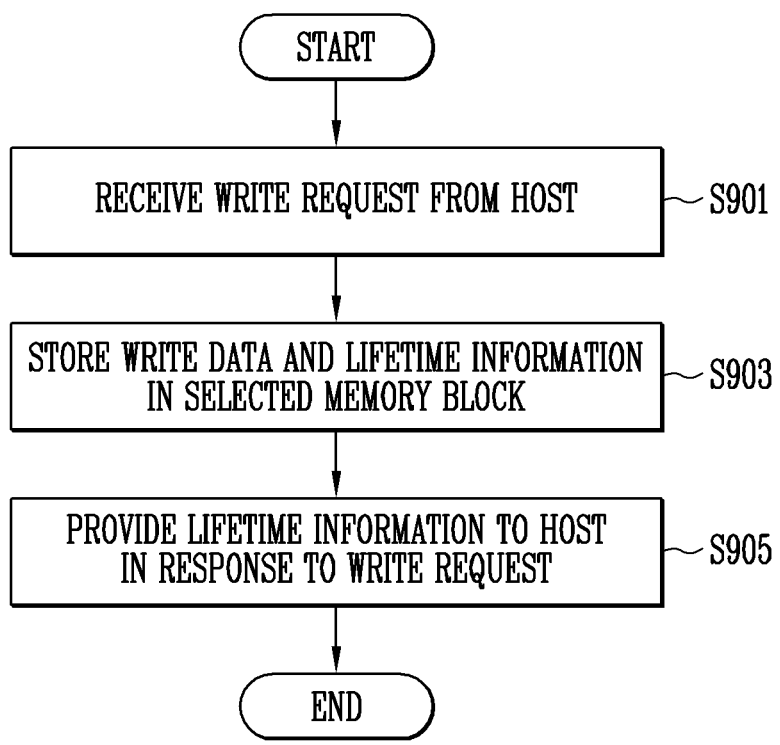
FIG. 9 is a flowchart illustrating an operation of a storage device according to an embodiment of the present disclosure.

FIG. 9 is a flowchart illustrating an operation of a storage device according to an embodiment of the present disclosure.

Referring to FIG. 9, in operation S901, the storage device may receive the write request from the host.

In operation S903, the storage device may store the write data and the lifetime information in the selected memory block according to the write request. The lifetime information may include the lifetime level of the memory block.

In operation S905, the storage device may provide the host with the lifetime information together with a response to the write request of the host.

Figure 10:
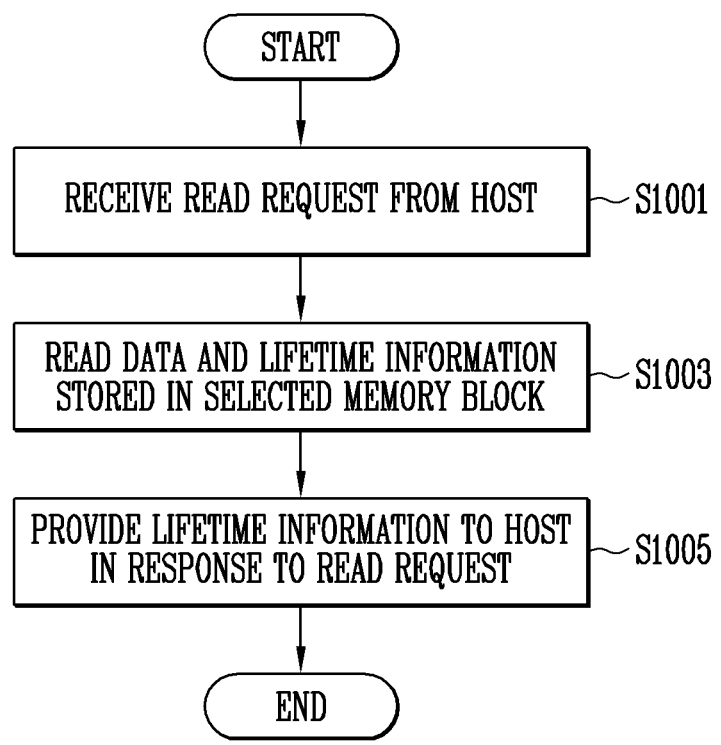
FIG. 10 is a flowchart illustrating an operation of a storage device according to an embodiment of the present disclosure.

FIG. 10 is a flowchart illustrating an operation of a storage device according to an embodiment of the present disclosure.

Referring to FIG. 10, in operation S1001, the storage device may receive the read request from the host.

In operation S1003, the storage device may read the data and the lifetime information stored in the selected memory block according to the read request.

In operation S1005, the storage device may provide the host with the lifetime information together with a response (i.e., the read data) to the read request of the host.

Figure 11:
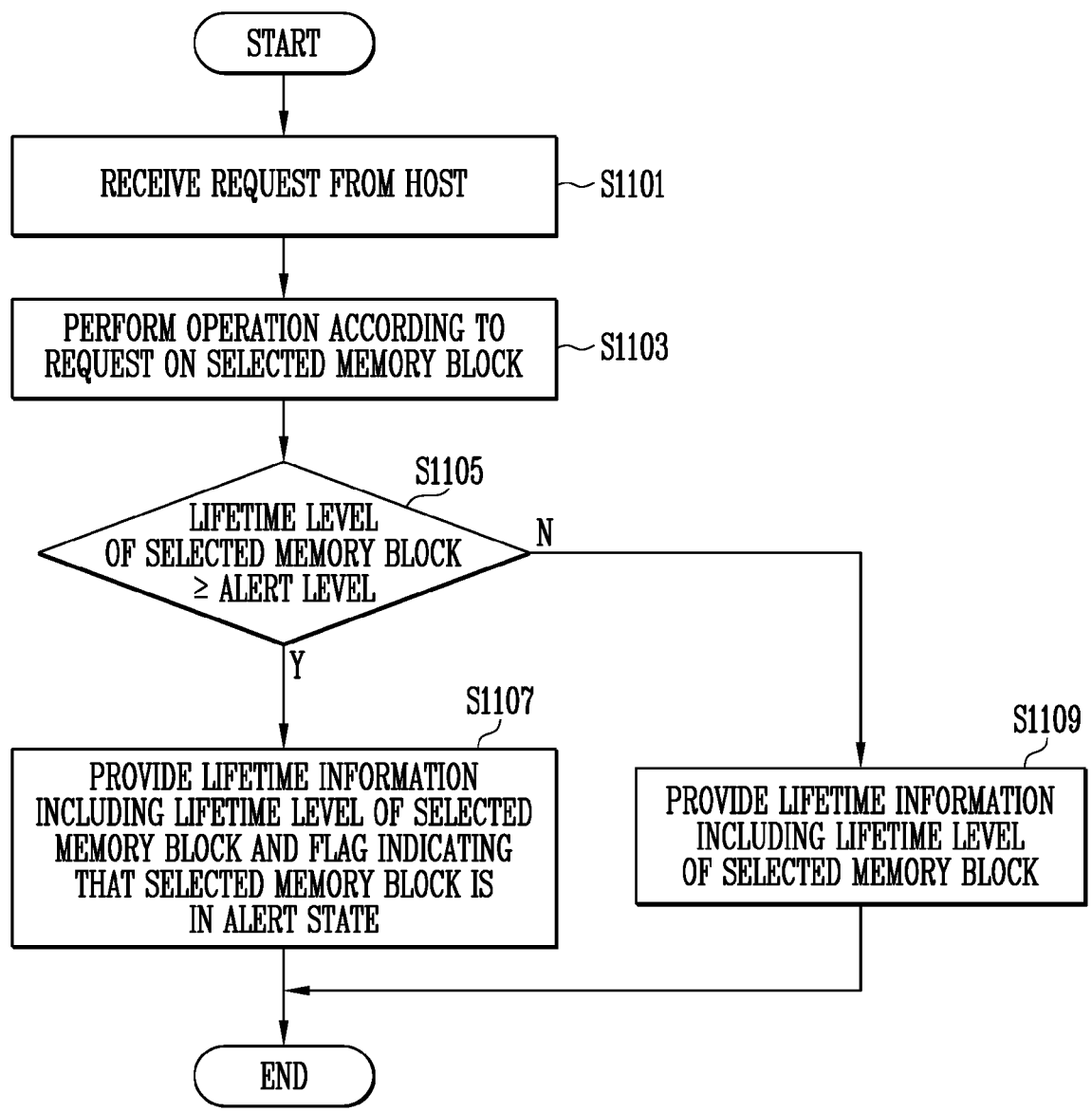
FIG. 11 is a flowchart illustrating an operation of a storage device according to an embodiment of the present disclosure.

FIG. 11 is a flowchart illustrating an operation of a storage device according to an embodiment of the present disclosure.

Referring to FIG. 11, in operation S1101, the storage device may receive the request from the host. The request may be the write request or the read request.

In operation S1103, the storage device may perform the operation according to the request on the selected memory block.

In operation S1105, the storage device may determine whether the lifetime level of the selected memory block is greater than or equal to the alert level. As a result of the determination, when the lifetime level is greater than or equal to the alert level, the operation proceeds to operation S1107, and when the lifetime level is less than the alert level, the operation proceeds to operation S1109.

In operation S1107, the storage device may provide the lifetime information including the lifetime level of the selected memory block and the flag indicating that the lifetime of the selected memory block is in the alert state to the host, in response to the request from the host.

In operation S1109, the storage device may provide the lifetime information including the lifetime level of the selected memory block to the host in response to the request of the host.

Figure 12:
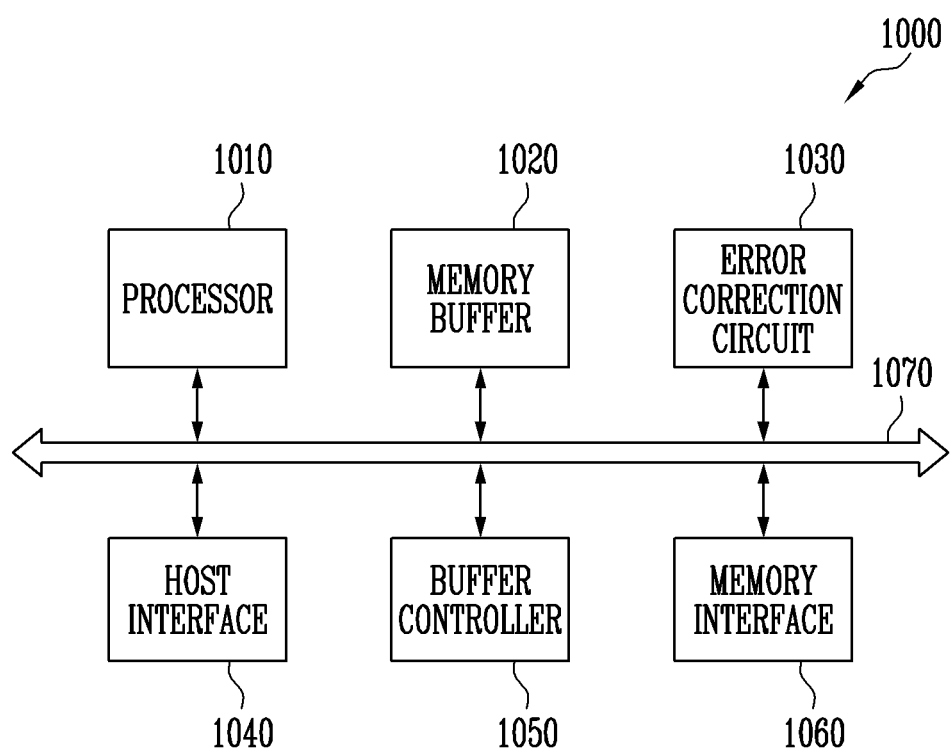
FIG. 12 is a diagram illustrating another embodiment of a memory controller of FIG. 1 according to an embodiment of the present disclosure.

FIG. 12 is a diagram illustrating another example of the memory controller of FIG. 1 according to an embodiment of the present disclosure.

Referring to FIG. 12, the memory controller 1000 is connected to a host and the memory device. The memory controller 1000 is configured to access the memory device in response to the request from the host. For example, the memory controller 1000 is configured to control the write, read, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction circuit (ECC circuit) 1030, a host interface 1040, a buffer controller 1050, a memory interface 1060, and a bus 1070.

The bus 1070 may be configured to provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 may convert a logical block address (LBA) provided by the host into a physical block address (PBA) through the flash translation layer (FTL). The flash translation layer (FTL) may receive the logical block address (LBA) and convert the logical block address (LBA) into the physical block address (PBA) using a mapping table. An address mapping method of the flash translation layer may include various methods according to a mapping unit. A representative address mapping method includes a page mapping method, a block mapping method, and a hybrid mapping method.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host.

In an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 is configured to communicate with an external host under control of the processor 1010. The host interface 1040 may be configured to perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1202, and the memory interface 1060.

Figure 13:
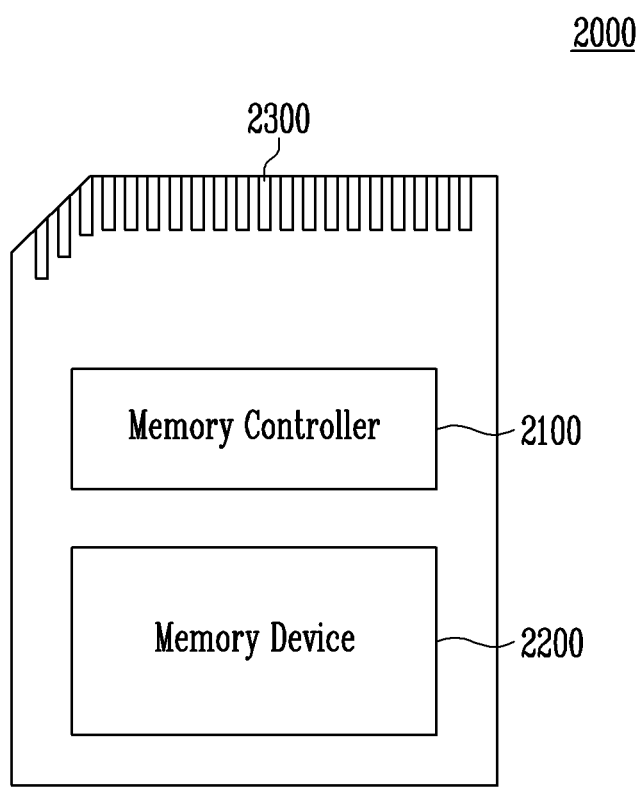
FIG. 13 is a block diagram illustrating a memory card system to which a storage device according to an embodiment of the present disclosure is applied.

FIG. 13 is a block diagram illustrating a memory card system to which the storage device according to an embodiment of the present disclosure is applied.

Referring to FIG. 13, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device

2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 14:
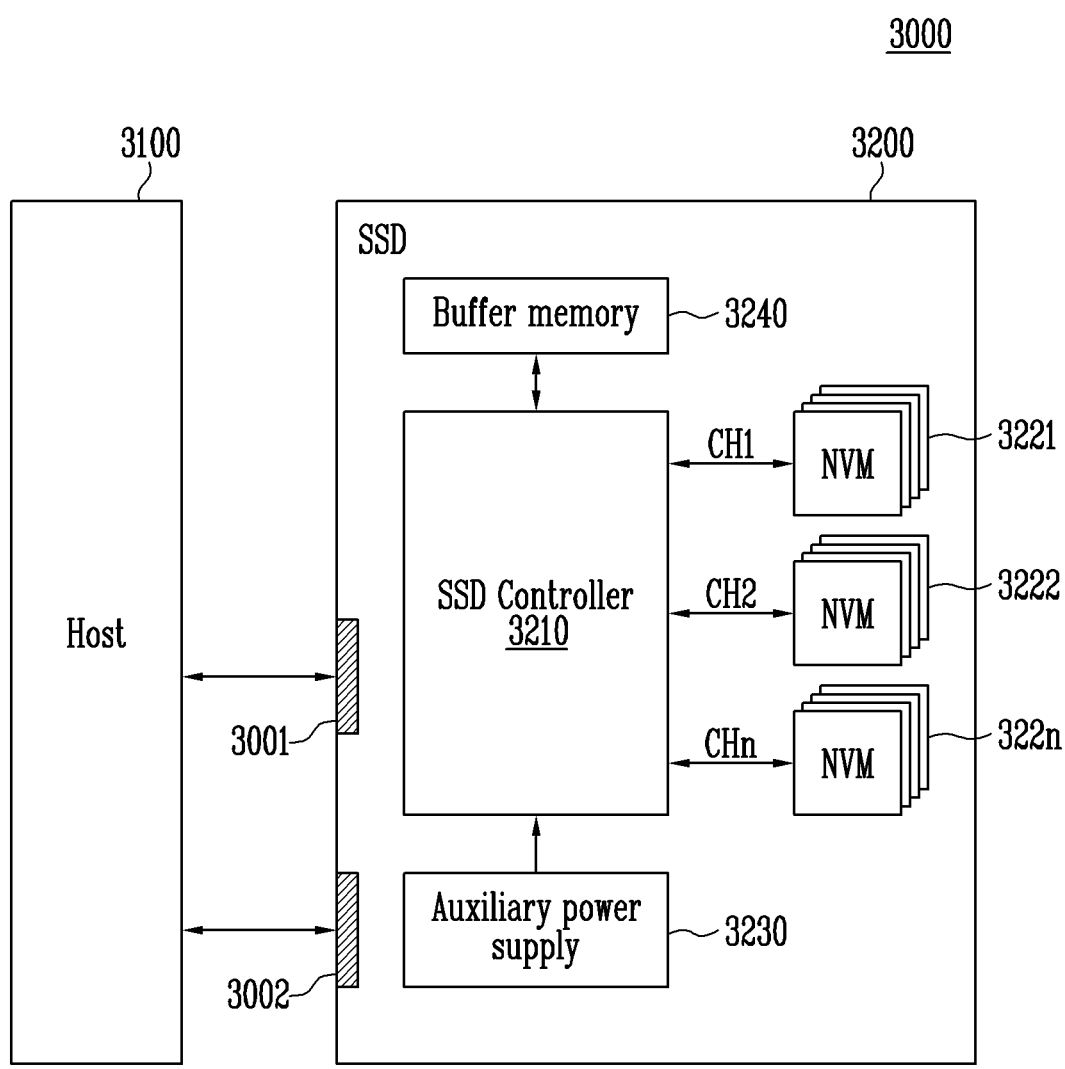
FIG. 14 is a block diagram illustrating a solid state drive (SSD) system to which a storage device according to an embodiment of the present disclosure is applied.

FIG. 14 is a block diagram illustrating a solid state drive (SSD) system to which the storage device according to an embodiment of the present disclosure is applied.

Referring to FIG. 14, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power PWR from the host 3100 and may charge the power. The auxiliary power supply 3230 may provide power to the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 15:
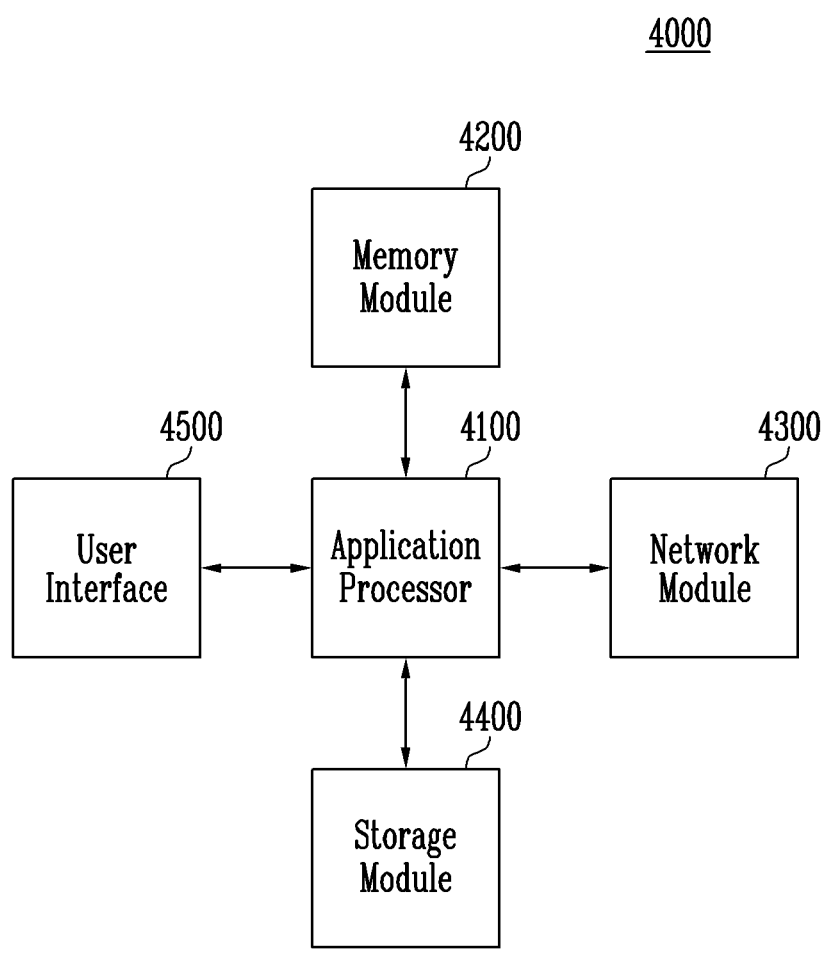
FIG. 15 is a block diagram illustrating a user system to which a storage device according to an embodiment of the present disclosure is applied.

FIG. 15 is a block diagram illustrating a user system to which the storage device according to an embodiment of the present disclosure is applied.

Referring to FIG. 15, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although a storage device and an operating method thereof have been described with reference to the specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, but these also do not depart from the scope of the present disclosure. In addition, those skilled in the art may easily change or modify the embodiments disclosed based on the present specification, and it is apparent that such changes or modifications also fall within the scope of the present disclosure and the following claims. Furthermore, the embodiments may be combined to form additional embodiments.

What is claimed is:

1. A memory controller which controls a memory device including a plurality of memory blocks, the memory controller comprising:
    a lifetime information controller configured to receive a lifetime reference setting command from a host and set a lifetime determination reference determining lifetime levels of the plurality of memory blocks in response to the lifetime reference setting command; and
    an operation controller configured to receive a write request from the host and control the memory device to perform a write operation on a selected memory block among the plurality of memory blocks in response to the write request,
    wherein the lifetime information controller generates lifetime information including a lifetime level of the selected memory block based on the lifetime determination reference, an erase and write count of the selected memory block, and
    wherein the operation controller provides, to the host, the lifetime information together with a response to the write request.

2. The memory controller of claim 1, wherein the operation controller controls the memory device to perform the write operation of storing write data corresponding to the write request and the lifetime information of the selected memory block in the selected memory block.

3. The memory controller of claim 2, wherein the operation controller is further configured to receive a read request from the host and control the memory device to perform a read operation of reading target data corresponding to the read request and the lifetime information stored in the selected memory block.

4. The memory controller of claim 3, wherein the operation controller is further configured to provide, to the host, the lifetime information together with the target data as a response to the read request.

5. The memory controller of claim 1, wherein the lifetime information controller is further configured to set an alert level in response to the lifetime reference setting command.

6. The memory controller of claim 1,
    wherein the lifetime determination reference includes at least one of a lifetime level table and a lifetime level function,
    wherein the lifetime level table includes a plurality of lifetime levels respectively corresponding to a plurality of sections divided by a plurality of reference values, and
    wherein the lifetime information controller is further configured to determine the lifetime level of the selected memory block based on a section to which the erase and write count of the selected memory block belongs among the plurality of sections.

7. The memory controller of claim 6,
    wherein the lifetime level function includes a maximum erase and write count of a memory block, and
    wherein the lifetime information controller is further configured to determine the lifetime level of the selected memory block by putting the erase and write count of the selected memory block into the lifetime level function.

8. The memory controller of claim 1, wherein the lifetime information controller generates the lifetime information including a flag indicating that a lifetime of the selected memory block is in an alert state, when the lifetime level is greater than or equal to an alert level.

9. A method of operating a memory controller which controls a memory device including a plurality of memory blocks, the method comprising:
    receiving a lifetime reference setting command from a host;
    setting a lifetime determination reference in response to the lifetime reference setting command;
    receiving a write request from the host;
    generating lifetime information including a lifetime level of a selected memory block based on the lifetime determination reference and an erase and write count of the selected memory block among the plurality of memory blocks;
    providing, to the memory device, a program command for storing write data and the lifetime information in the selected memory block; and
    providing, to the host, the lifetime information together with a response to the write request.

10. The method of claim 9, further comprising:
    receiving a read request from the host;
    providing a read command for reading the lifetime information and target data stored in the selected memory block; and
    providing, to the host, the lifetime information together with the target data as a response to the read request.

11. The method of claim 9, wherein the setting the lifetime determination reference in response to the lifetime reference setting command comprises setting an alert level in response to the lifetime reference setting command.

12. The method of claim 11, wherein the generating the lifetime information comprises generating the lifetime information including a flag indicating that a lifetime of the selected memory block is in an alert state, when the lifetime level is greater than or equal to the alert level.

13. The method of claim 9,
wherein the lifetime determination reference includes a lifetime level table,
wherein the lifetime level table includes a plurality of lifetime levels respectively corresponding to a plurality of sections divided by a plurality of reference values, and
wherein the generating the lifetime information comprises determining the lifetime level based on a section to which the erase and write count of the selected memory block belongs among the plurality of sections.

14. The method of claim 9,
wherein a lifetime level function includes a maximum erase and write count of a memory block, and
wherein the generating the lifetime information comprises determining the lifetime level by putting the erase and write count of the selected memory block into the lifetime level function.

15. A storage device comprising:
a memory device including a plurality of memory blocks; and
a memory controller configured to:
set a lifetime determination reference in response to a lifetime reference setting command provided from a host,
control the memory device to perform an operation on a selected memory block among the plurality of memory blocks according to a request provided from the host,
generate lifetime information including a lifetime level of the selected memory block based on the lifetime determination reference and an erase and write count of the selected memory block, and
provide, to the host, the lifetime information together with a response to the request.

16. The storage device of claim 15, wherein the memory controller is further configured to:
set an alert level in response to the lifetime reference setting command provided from the host, and
determine the lifetime level of the selected memory block based on the erase and write count of the selected memory block.

17. The storage device of claim 16, wherein the memory controller generates the lifetime information including a flag indicating that a lifetime of the selected memory block is in an alert state, when the lifetime level is greater than or equal to the alert level.

* * * * *